United States Patent [19]

Höglund et al.

[11] Patent Number: 5,039,320

[45] Date of Patent: Aug. 13, 1991

[54] APPARATUS FOR FLUIDIZING, DEGASSING AND PUMPING A SUSPENSION OF FIBROUS CELLULOSE MATERIAL

[75] Inventors: Ronny Höglund, Skoghall; Ulf Jansson, Karlstad, both of Sweden

[73] Assignee: Kamyr AB, Karlstad, Sweden

[21] Appl. No.: 416,466

[22] Filed: Oct. 3, 1989

[30] Foreign Application Priority Data

Mar. 29, 1989 [SE] Sweden ............................ 8901082-1

[51] Int. Cl.$^{5}$ ............................................ B01D 19/00

[52] U.S. Cl. .................................. 55/203; 415/169.1; 415/143

[58] Field of Search ................ 55/203; 415/169.1, 143

[56] References Cited

U.S. PATENT DOCUMENTS

| | | | |
|---|---|---|---|
| 4,410,337 | 10/1983 | Gullichsen et al. | 55/21 |
| 4,435,193 | 3/1984 | Gullichsen et al. | 55/21 |
| 4,675,033 | 6/1987 | Fellman et al. | 55/203 |
| 4,834,547 | 5/1989 | Niskanen | 55/203 |
| 4,877,368 | 10/1989 | Timperi et al. | 55/203 |
| 4,877,424 | 10/1989 | Perkola et al. | 55/203 |

*Primary Examiner*—Bernard Nozick

*Attorney, Agent, or Firm*—Cushman, Darby & Cushman

[57] ABSTRACT

An apparatus for fluidizing, degassing and pumping a suspension of fibrous cellulose material is described which comprises a housing, a fluidizing rotor and an impeller of radial type, said housing having a cylindrical portion for the rotor, a portion for the impeller which is radially enlarged in relation to the cylindrical portion, a wall means closing one end of the housing and a shaft rigidly connected to the impeller, an axial inlet for suspension being disposed at the cylindrical portion, and a radial outlet for suspension at the radially enlarged portion. The apparatus has also a degassing system for removing gas which collects in front of the impeller and comprising opening means in the impeller and said wall means, said impeller having a hub, a partition and forward and rear blades. Furthermore, the impeller is provided with a concentric, circular inlet for the continuous supply of suspension to the rear blade space, the rear blades being arranged to exert a pump action on the suspension supplied to the apparatus.

15 Claims, 4 Drawing Sheets

APPARATUS FOR FLUIDIZING, DEGASSING AND PUMPING A SUSPENSION OF FIBROUS CELLULOSE MATERIAL

FIELD AND BACKGROUND OF THE INVENTION

The present invention relates to an apparatus for fluidizing, degassing and pumping a suspension of fibrous cellulose material.

Apparatuses for fluidizing, degassing and pumping pulp of medium consistency are known through U.S. Pat. No. 4,410,337 and U.S. Pat. No. 4,435,193 (corresponding to SE 8102118-0). The apparatuses described therein comprise a housing, a fluidizing rotor and an impeller of radial type axially aligned with the rotor, said housing comprising a cylindrical portion for the rotor, a portion for the impeller, said portion being radially enlarged in relation to the cylindrical portion, a wall closing one end of the housing and a shaft extending through the wall and being rigidly connected to the impeller. The housing is provided with an axial inlet for suspension at the cylindrical portion, a radial outlet for suspension at the radially enlarged portion and a degassing system for removing gas collecting in front of the impeller and comprising openings in the impeller and the wall, said impeller having a hub, a partition surrounding the hub and a plurality of forward blades facing said axial inlet of the housing, and a plurality of rear blades facing away from said axial inlet, said forward and rear blades being rigidly connected to the partition. The purpose of the rear blades is only to separate pulp which may. have accompanied the gas flow through a plurality of small openings in the partition which is formed as a plate. These small openings have a total through-flow area which is too small to supply any. controlled, large quantity of pulp to the rear blade space, neither are they located at such a radial distance from the central axis that pulp can flow through them in a controllable manner, i.e. the openings are located within the radial extension of the gas bubble during normal operation, solely in order to be included in the degassing system. Furthermore, the rear blades have considerably smaller width than the forward blades, which further indicates that they are not intended to exert a pump action on any continuously supplied pulp. The known apparatuses have satisfactory performance with respect to all functions, but improvement is nevertheless desirable.

SUMMARY OF THE INVENTION

The object of the present invention is to provide an apparatus for fluidizing, degassing and pumping a suspension of fibrous cellulose material, with improved performance, at least with respect to the pump action.

The invention provides an apparatus for fluidizing, degassing and pumping a suspension of fibrous cellulose material, comprising a housing, a fluidizing rotor and an impeller of radial type axially aligned with the rotor, said housing comprising a cylindrical portion for the rotor, a portion for the impeller, said portion being radially enlarged in relation to the cylindrical portion, a wall means closing one end of the housing and a shaft extending through said wall means and being rigidly connected to at least the impeller, the housing being provided with an axial inlet for suspension at the cylindrical portion, a radial outlet for suspension at the radially enlarged portion and a degassing system for removing gas collecting in front of the impeller and comprising opening means in the impeller and the wall means, said impeller having a hub, a partition surrounding the hub and a pluralit.y of forward blades facing the inlet of the housing, and a plurality of rear blades facing away from said inlet, said blades being rigidly connected to said partition, said impeller being provided with a concentric, circular inlet for the continuous supply of suspension to a rear blade space for the rear blades, said rear blades being arranged to exert a pump action on at least a part of the suspension supplied to the apparatus. The expression "circular inlet" is used to define an opening extending around the impeller and being broken substantially only by possible transition portions between the forward and rear blades. It is preferred to connect the blades together by means of such transition portions.

BRIEF DESCRIPTION OF THE DRAWINGS

The invention will be described further in the following, with reference to the accompanying drawings.

DESCRIPTION OF ILLUSTRATED EMBODIMENT

Figure 1:
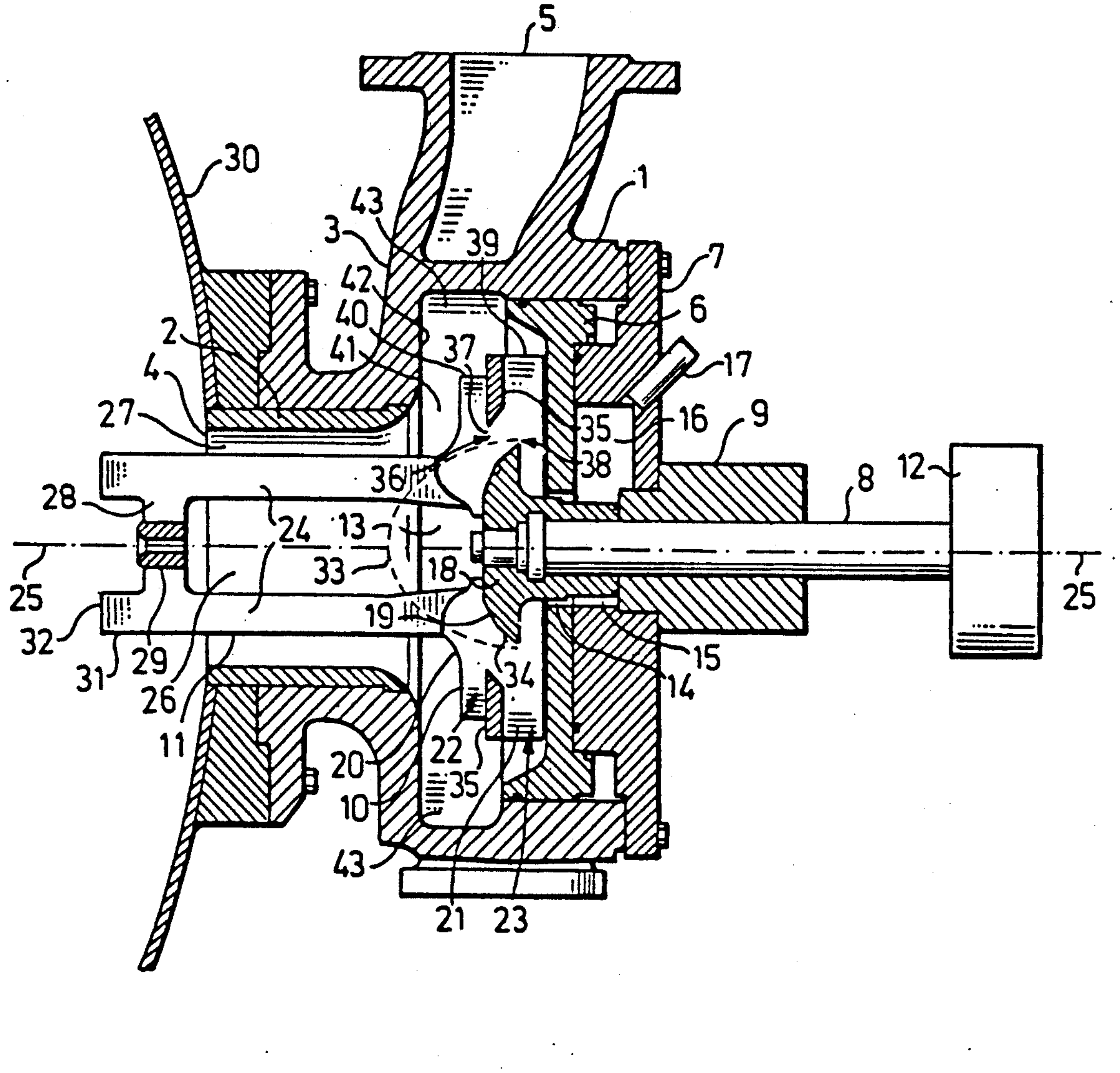
FIG. 1 shows schematically a longitudinal section through an apparatus having an impeller according to the invention, and a rotor attached thereto.

Referring now to FIG. 1, a multi-functional apparatus is shown for fluidizing, pumping and degassing a fiber suspension, particularly a suspension of medium consistency, i.e. about 6–15%, at which consistency conventional centrifugal pumps cannot be used. The apparatus comprises a housing 1 with a cylindrical portion 2 and a portion 3 radially enlarged in relation thereto.

The housing is provided with an axially, concentric inlet 4 for suspension, located at the end of the cylindrical portion 2, and a radial outlet 5 for degassed suspension, located at the radially enlarged portion 3. A wall means closes the housing 1 at the end opposite from the inlet 4, said wall means comprising an inner wall element 6 and an outer wall element 7. A shaft 8 extends through the wall elements 6, 7 into the housing 1 and is surrounded by suitable sealing and bearing units 9 located at the outer wall element 7. Inside the housing is an impeller 10 of radial type, disposed inside the radially enlarged portion 3, and a fluidizing rotor 11 disposed in the cylindrical portion 2 of the housing and rigidly connected to the impeller 10 so that the rotor 11, impeller 10 and shaft 8 together form a rotary unit driven by a motor 12, the shaft 8 being rigidly connected to the impeller 10. The apparatus is provided with a degassing system for removing gas from a central space 13 of the housing in front of the impeller 10. The degassing system comprises opening means in the impeller 10, annular gaps 14, 15 between the wall elements 6, 7 and shaft 8 and a radial outlet 16 in the outer wall element 7, said outlet 16 communicating with the atmosphere via a pipe 17.

Figure 3:
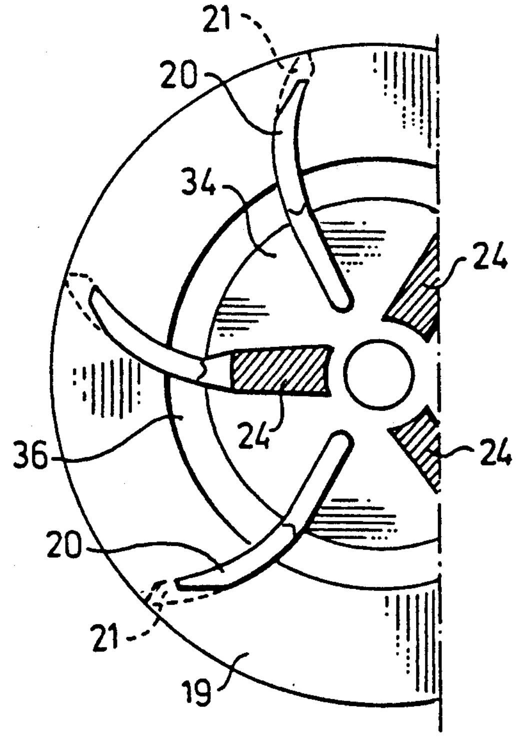
FIG. 3 is a cross section along the line III—III in FIG. 2.
Figure 4:
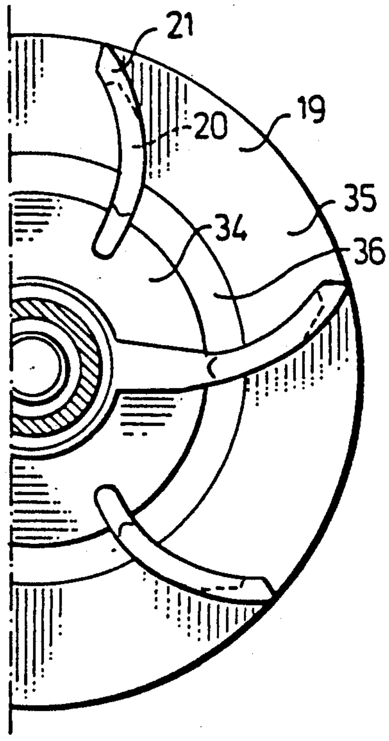
FIG. 4 is a cross section along the line IV—IV in FIG. 2.

The impeller 10 comprises a hub 18, a partition 19 and a plurality of forward blades 20 with their side edges facing the inlet 4 and a plurality of rear blades 21 with their side edges facing the inner wall element 7, said blades 20, 21 being rigidly connected to the partition 19 and running in a forward space 22 and a rear space 23. The blades 20, 21 are preferably curved backwards against the direction of rotation of the impeller 10, as shown in FIGS. 3 and 4.

The rotor 11 comprises a plurality of blades 24, rigidly connected to the impeller 10 and extending concentrically along the central axis 25 of the housing, at a distance therefrom and from the cylindrical inner side of the cylindrical portion 2 so that a free internal space 26 and a free external, annular space 27 are formed in relation to the blades 24. The blades 24 extend out of the housing 1 and are connected by cross-stays 28 extending from a central bushing 29 for journalling the rotor 11 on a support (not shown).

The apparatus can be disposed horizontally or vertically in an opening in the bottom of a container containing a fiber suspension of medium consistency. In the embodiment shown, the apparatus is mounted vertically in an opening in the bottom of a container 30. The end portion 31 of the rotor 11, located outside the housing 1, thus extends into the container 30, effecting turbulence in the fiber suspension around it, enabling the suspension to flow more easily through the inlet 4, into the cylindrical portion 2 of the housing. The end portion 31 of the rotor 11 has suitably such a length that its outer end 32, opposite to the impeller 10, is located in the container 30 at a distance of about 30–150 mm from the inside of the container. The rotation of the rotor blades 24 sets the fiber suspension in movement at such high speed, and the rotor blades produce such turbulence that the fiber suspension is fluidized into a pumpable state. At the same time, gas separation is obtained, the gas being collected at the centre of the housing 1, in front of the impeller 10, thus producing a gas bubble 33 which maintains its size in controllable manner so that the pumping action of the impeller 10 is not adversely affected. Said degassing system may comprise an external vacuum pump 46 which continuously withdraws gas from the apparatus and which is connected to the outlet 17. Alternatively, a vacuum pump may be built into the apparatus, this then having a special blade impeller driven by the shaft 8.

According to the invention, the partition 19 of the impeller 10 consists of an inner flange 34 on the hub 18 and a concentric plane, i.e. a radial ring 35, located outside the flange 34 at a predetermined distance therefrom so that a concentric, circular inlet 36 is formed between the flange 34 and ring 35, primarily for suspension to the rear blade space 23. The impeller 10 is preferably provided with the same number of rear and forward blades, 20, 21. The blades are disposed in pairs opposite each other and connected to each other in the inlet 36, without visible boundaries, by a transition portion 37, i.e. each forward blade 20 is formed in one piece with the opposite rear blade 21. The inlet 36 is shaped generally as an annular gap, circumferentially broken only by said transition portions 37. The inner diameter of the ring 35 and the outer diameter of the flange 34 are adapted to each other such that the gap 36 has sufficiently large through-flow area to permit a continuous flow of suspension to the rear blade space 23, and is also located at sufficiently large radial distance from the central axis 25 so that it will for the most part lie substantially axially in line with suspension flowing towards the impeller 10 radially outside the central gas bubble 33 occurring in front of the hub 18. The size of said bubble 33 is dependent on the operating conditions in each particular case, such as first of all the speed of rotation of the shaft 8 and the proportion of gas present in the suspension flowing in. Thus, if the radial distance of the gap 36 is too small for a specified operating run where the outer radius of the gas bubble close to the impeller 10 is greater than the outer radius of the gap 36, no suspension will be able to reach the gap 36 since it will be blocked by the gas bubble 33. The generally annular gap 36 can still be used to remove gas from the central region of the housing in front of the impeller, as intended in the preferred embodiment shown in FIG. 1, since the radially inner annular region 38 of the gap 36, i.e. the region closest to the flange 34, is situated at such radial distance from the central axis 25 as to lie substantially axially in line with outer portions of the gas bubble 33, i.e. the outer diameter of the flange 34 is so small that it lies within the radial extension of the gas bubble 33. Said inner region 38 of the gap 36 thus constitutes said opening means of the impeller partition 19. Alternatively the flange 34 may be provided with a plurality of small axial openings formed to communicate with the gas bubble, in which case the outer diameter of the flange 34 can be adjusted so that none, or only a small portion, of the gas is removed through the gap 36. The radial distance of the generally annular gap 36 to the central axis 25, on the other hand, would not be so great that the radial extension of the ring 35 becomes too small for a given impeller, resulting in unfavourable pump action between the blades. In general, the gap 36 is disposed substantially axially in line with the outer, annular space 27 located between the surface generated by the rotor blades 24 and the cylindrical portion 2, or slightly inside this space 27, depending on the size of the gas bubble 33 and its radial extension in front of the impeller.

Designing the impeller 10 with an inlet 36 for continuously supplying suspension to the rear blade space 23 also allows the rear blades 21 to be used to provide pumping action, i.e. for supplying pressure energy and kinetic energy to the suspension. By the present invention, therefore, the rear blades 21 can be responsible for a larger proportion of the pump action exerted on the suspension by the impeller 10. To increase the proportion of energy transmitted to the suspension by the rear blades 21, therefore, the rear blades 21 are preferably given greater axial width than the forward blades 20, calculated within the region of the ring 35, while maintaining the same total axial width for the impeller, seen at the blades, at the same time as the rear blades 21 are designed so that their peripheral edges 39, parallel to the central axis 25, are at a greater radial distance from the central axis than the peripheral edges 40 of the forward blades 20. The axial extension of the rear blades 21 is suitably about 1.3–3.5 times greater than the axial extension of the forward blades 20 measured within the region of the peripheral ring 35. The forward blades 20 cannot be omitted since they provide a turbulent flow running initially in contact with the main flow leaving the rear blades 21, and advantageously guiding the main flow towards the outlet 5 so that none, or at most a small portion, of this main flow will become turbulent and be returned into a space 41 between the radially inner side 42 and the forward blades 20. Furthermore, the forward blades 20 are also necessar.y for throwing out scrap and other larger objects occurring in the suspension, towards the outlet 5. For this reason, the forward blades 20 are formed with a wider portion in the region located substantially within the radial extension of the rotor blades 24, as shown in FIGS. 1 and 2.

In comparison with a conventional impeller where the rear blades are not disposed or intended to exert a continuous pump action on the suspension and no inlet is provided for continuous supply of suspension to the rear blade space, at the apparatus according to the invention at least the peripheral portion of the partition 19 is displaced in relation to an inner portion thereof, in the direction from the inner wall element 6 and is formed as a ring 35. At the same time, between itself and an inner portion, i.e. flange 34, of the partition 19, it defines an inlet 36 having such through-flow area and being so located in relation to the central axis 35 that a continuous flow of suspension is obtained to the rear, thus wider blades 21.

As shown in FIG. 1, the impeller is surrounded by a worm 43 leading to the radial outlet 5.

Figure 2:
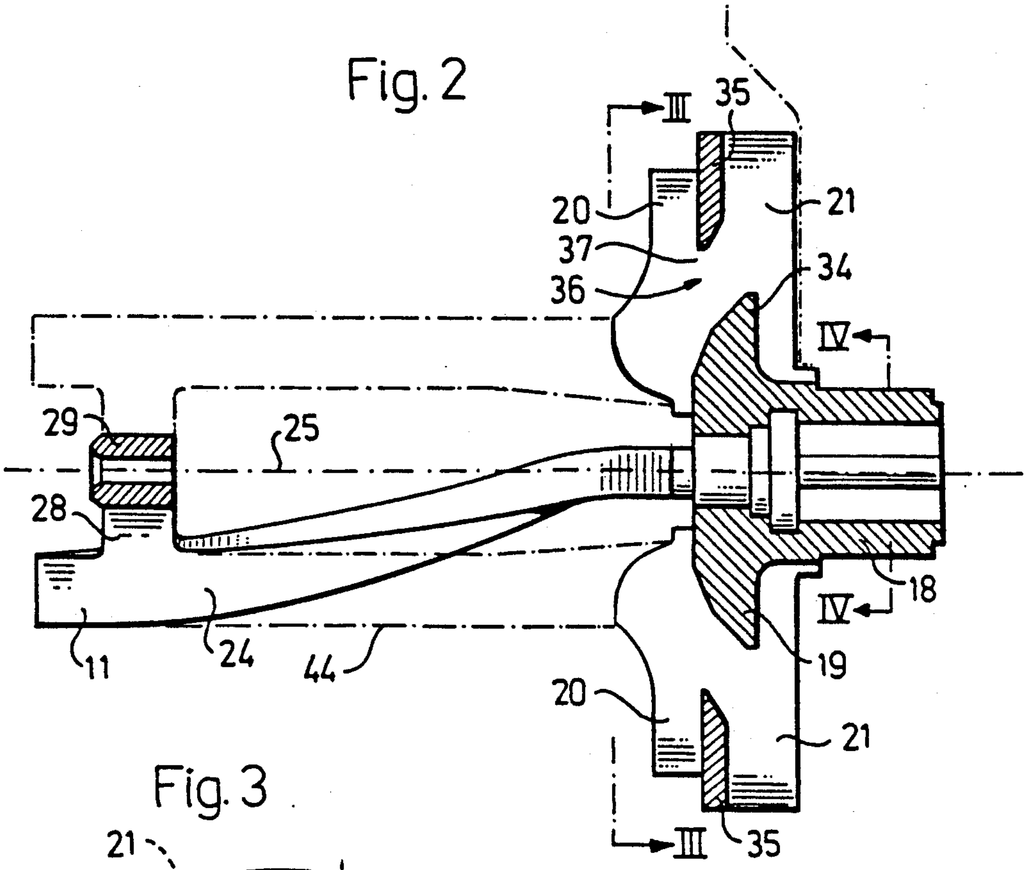
FIG. 2 shows the impeller according to FIG. 1, with a rotor of modified design attached thereto.

Four straight rotor blades 24 and eight forward and rear blades 20, 21 are used in the embodiment of rotor and impeller unit shown in FIG. 1, whereas the embodiment shown in FIGS. 2 to 4 has three rotor blades 24 and six forward and rear blades 20, 21. The latter rotor blades extend helically along the central axis 25, generating a cylindrical surface 44 during rotation. The radial extension of the three rear blades 21, located opposite the rotor blades, suitably continues to the hub 18, as shown in FIG. 4, so that said rear blades 21 will throw out an.y fibers that may accompany the gas withdrawn. The inner ends of the other three rear blades 21 are located at a short distance from the hub 18.

In the embodiment shown in FIGS. 1 and 2, the facing surfaces of the flange 34 and ring 35 are bevelled so that the gap 36 emerges into the rear blade space 23 at a radially greater distance from the central axis 25 than on the side located at the forward blades. The effective through-flow area of the thus substantially conical gap is thus increased and at the same time the suspension is guided by the inclined surfaces to flow obliquely outwards and forwards in a manner beneficial to the flow process.

According to an alternative embodiment (not shown), the impeller is supplemented with a substantially radial disc or plate which is rigidly connected to the hub and also to the rear blades 21 so that the rear blade space 23 is closed on the side facing the inner wall element 6. The disc is provided in known manner with small openings in the vicinity of the hub to allow a gas flow through to the openings 14 and 15, possibly via a radial and axial space between the plate and the inner wall element 6. Also in known manner, this space may. contain blades secured to the rear side of the plate, disposed to throw out fibers which may accompany the gas flow. Said space communicates with the outlet 5.

Figure 5:
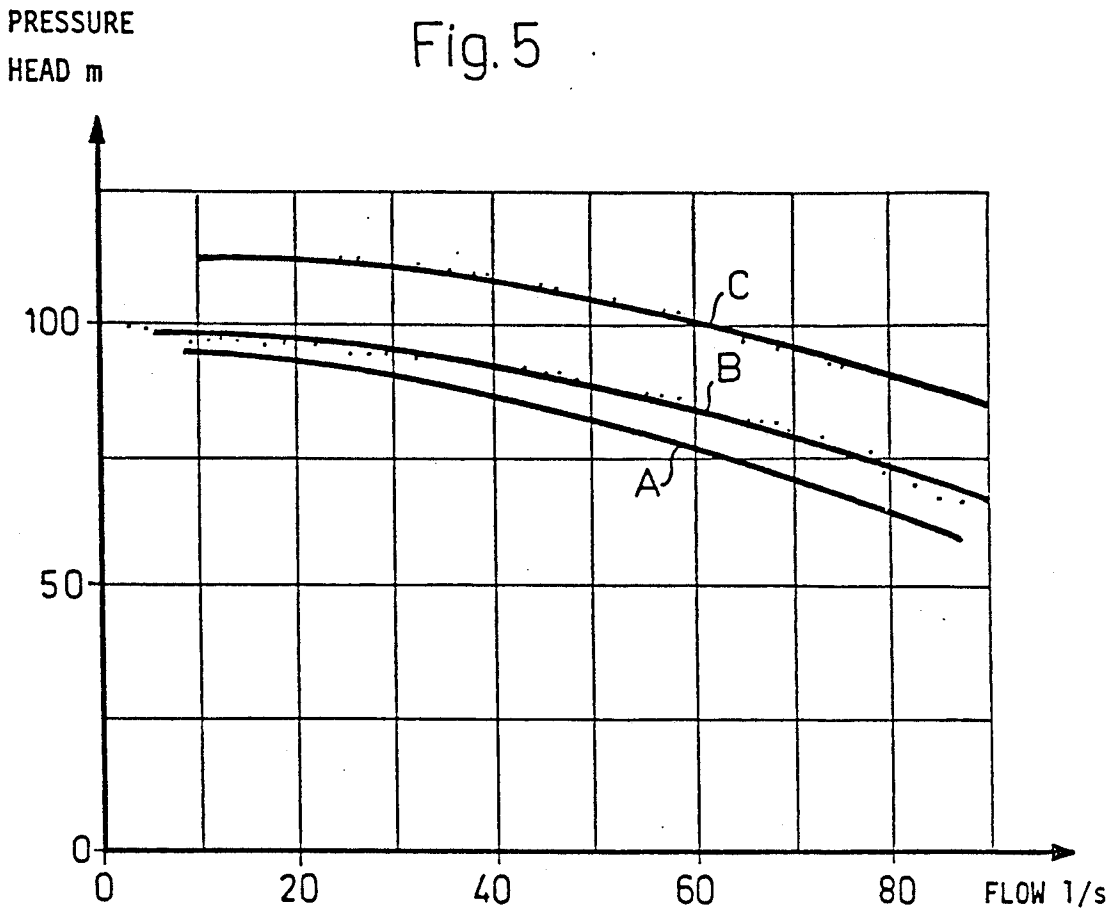
FIG. 5 is a diagram of results from comparative experiments and indicates pressure head as a function of flow.
Figure 6:
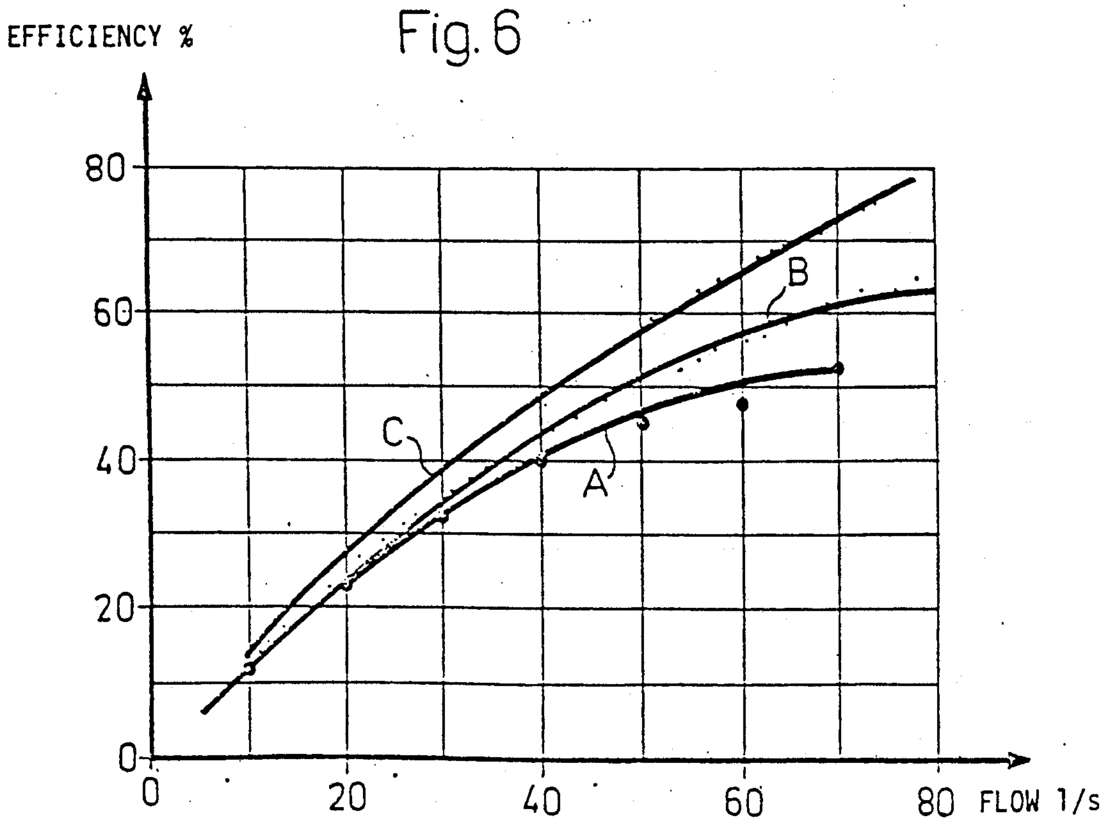
FIG. 6 is a diagram of results from comparative experiments and indicating efficiency as a function of flow.
Figure 7:
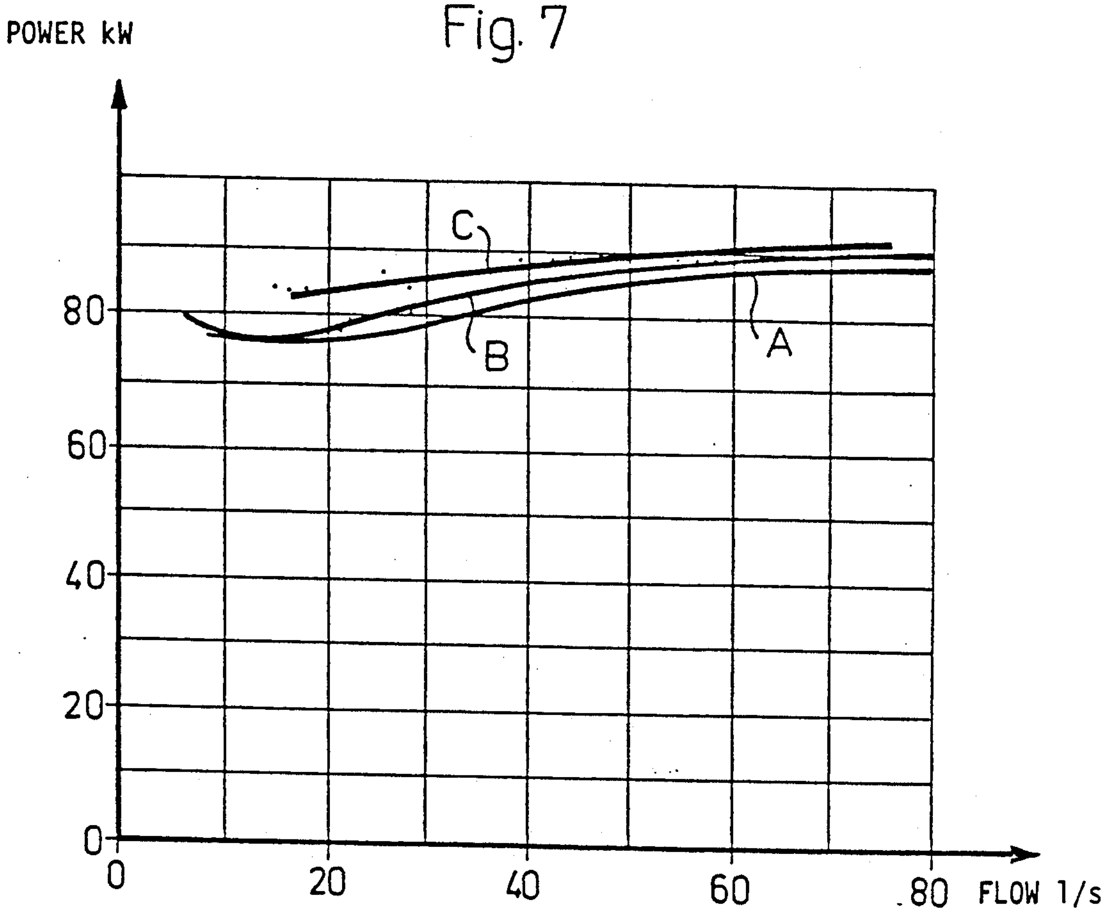
FIG. 7 is a diagram of results from comparative experiments and indicating power consumption as a function of flow.

Experiments have been performed with a known apparatus A of the type described in the introduction part, a first apparatus B according to the invention, the rear blades 21 having a smaller width than the forward blades 20, and a second apparatus C according to the invention where the width of the rear blades 21 was considerably greater than that of the forward blades, the total width of a forward blade and a rear blade being the same in the three apparatuses A, B and C. The diameter of the impellers was also the same, and the speed was about 2950 rpm, in all three cases. The concentration of the pumped pulp was 12% and its temperature was 50° C. The flow was varied and measured on the pressure side. The pressure head, efficiency and power consumption were calculated and noted as functions of the flow. The results obtained are shown in the diagrams in FIGS. 5, 6 and 7, wherein the three curves A, B and C represent the apparatus used as denoted above. It is seen in FIG. 5 that, in comparison with apparatus A, a flow of 50 l/s, for instance, resulted in 7% increased pressure head for apparatus B and 28% increased head for apparatus C. The power consumption was only 3% and 6% higher, as shown in the diagram according to FIG. 7. This means improved efficiency, as is also confirmed by the diagram shown in FIG. 6 where the degree of efficiency at a flow of 50 l/s was 46%, 52% and 57%, respectively, or almost 13% higher efficiency for apparatus B and almost 24% higher efficiency for apparatus C than for apparatus A. The differences are even greater with a higher flow rates, e.g. 70 l/s. The results are most surprising.

What is claimed is:

1. Apparatus for fluidizing, degassing and pumping a suspension of fibrous cellulose material, comprising:

a housing having a cylindrical portion defining an axis and having first and second axially spaced ends; an elongated portion extending axially, and generally concentrically, from said cylindrical portion; first wall means closing said first end of said cylindrical portion with said second end in open communication with said elongated portion to define, with said elongated portion, an axial inlet for suspension; means defining an opening in said first wall means through which gas may pass; and a radial outlet for suspension from said cylindrical portion;

a fluidizing rotor with an impeller, said impeller having a hub, and a partition surrounding said hub;

a shaft extending through said first wall means and mounting said rotor for rotation within said housing about an axis generally coincident with said housing cylindrical portion axis;

degassing means for removing gas collecting in front of said impeller and expelling it through said gas opening in said first wall means; and means for exerting a pumping action on the suspension to increase the head acting thereon, said means comprising: a plurality of forward blades, and a plurality of rear blades, both sets of blades operatively connected to said impeller adjacent said hub, and separated by said partition, the forward blades being located on the side of the partition closest to the housing inlet, and the rear blades being located on the side of the partition closest to the first wall means, and means defining a concentric inlet in said partition for continuously supplying suspension from the housing inlet to said rear blades to be pumped thereby, said rear blades having an axial extension within the region of the outer ring which is greater than the axial extension of the forward blades.

2. Apparatus as recited in claim 1 wherein said wall means comprises an inner wall element and an outer wall element, the inner wall element adjacent said rear blades, and said outer wall element having said gas opening extending therethrough.

3. Apparatus as recited in claim 1 wherein said concentric inlet in said partition comprises an annular opening.

4. An apparatus as recited in claim 1 wherein the axial extension of the rear blades is about 1.3–3.5 times greater than the axial extension of the forward blades.

5. An apparatus as recited in claim 1 wherein the outer edge of the rear blades is located at a greater radial distance from the central axis than the outer edge of the forward blades.

6. An apparatus as recited in claim 1 wherein the impeller comprises a substantially radial disc which is rigidly connected to the rear blades so that the rear blade space is closed on the side facing the wall means, said disc having small openings for gas in the vicinity of the hub and being preferably disposed at an axial distance fromt he wall means in order to define a space for blades disposed on the rear side of the disc.

7. An apparatus as recited in claim 1 wherein the rotor is provided with an end portion located outside the housing, the apparatus being arranged to be mounted in an opening of a container containing suspension to be pumped, so that the outer end of the impeller, facing away from the rotor is located in the container at a distance of about 30–150 mm from the inside of the container.

8. An apparatus as recited in claim 1 wherein said degassing system includes a vacuum pump disposed outside the housing.

9. An apparatus as recited in claim 1 wherein the partition consists of an inner, concentric flange and an outer concentric ring which is located at a distance from the flange to define therebetween said concentric inlet in the form of an annular gap.

10. An apparatus as recited in claim 9 wherein the outer ring is displaced in the direction from the wall means closing one end of the housing in relation to the peripheral edge of the flange, which is located nearest said wall means.

11. An apparatus as recited in claim 9 wherein the forward and rear blades are disposed in pairs opposite each other, the blades in each pair being connected to each other by a transition portion in said annular gap, said transition portions forming the only interruptions around the gap.

12. An apparatus as recited in claim 9 wherein the facing surfaces of the ring and the flange are bevelled from the inside and outwards, seen in the flow direction of the suspension, so that the gap is substantially conical.

13. An apparatus as recited in claim 9 wherein the gap is located at a predetermined radial distance from the central axis so that the gap lies within the area of the suspension flowing from the rotor and completely outside a central gas bubble, or with a radially inner region within the outer portion of the gas bubble produced by gas present in the suspension, said inner region forming said opening means in the impeller.

14. An apparatus as recited in claim 1 wherein the rotor comprises a plurality of blades, rigidly connected to the impeller and extending concentrically along the central axis of the housing, at a distance therefrom and from the cylindrical inner side of the cylindrical portion so that a free internal space and a free external, annular space are formed in relation to the blades.

15. An apparatus as recited in claim 14 wherein the blades extend helically along the central axis.

* * * * *